United States Patent
Kim et al.

(10) Patent No.: US 9,296,643 B2
(45) Date of Patent: Mar. 29, 2016

(54) ENAMEL COMPOSITION, PREPARATION METHOD THEREOF, AND COOKING APPLIANCE INCLUDING THE SAME

(71) Applicant: LG ELECTRONICS INC., Seoul (KR)

(72) Inventors: Youngseok Kim, Seoul (KR); Yongsoo Lee, Seoul (KR); Namjin Kim, Seoul (KR); Youngjin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 331 days.

(21) Appl. No.: 13/889,947

(22) Filed: May 8, 2013

(65) Prior Publication Data
US 2013/0299482 A1 Nov. 14, 2013

(30) Foreign Application Priority Data

May 10, 2012 (KR) .................. 10-2012-0049545
Mar. 21, 2013 (KR) .................. 10-2013-0030200

(51) Int. Cl.
| | |
|---|---|
| A21B 1/00 | (2006.01) |
| C03C 8/20 | (2006.01) |
| C03C 3/064 | (2006.01) |
| C03C 8/08 | (2006.01) |
| F24C 15/00 | (2006.01) |
| C03C 4/20 | (2006.01) |
| C03C 8/14 | (2006.01) |

(52) U.S. Cl.
CPC . *C03C 8/20* (2013.01); *C03C 3/064* (2013.01); *C03C 4/20* (2013.01); *C03C 8/08* (2013.01); *C03C 8/14* (2013.01); *F24C 15/005* (2013.01); *C03C 2205/04* (2013.01); *C03C 2207/02* (2013.01); *C03C 2207/04* (2013.01)

(58) Field of Classification Search
CPC .............. C03C 8/20; C03C 8/08; C03C 8/06; C03C 8/00; C03C 4/20; C03C 2205/04; F24C 15/005; Y10T 428/28; Y10T 428/252; H05B 6/6402
See application file for complete search history.

(56) References Cited

U.S. PATENT DOCUMENTS

| | | | |
|---|---|---|---|
| 4,110,487 A | | 8/1978 | Rion |
| 5,296,415 A | * | 3/1994 | Podesta ..................... 501/25 |
| 2007/0265154 A1 | | 11/2007 | Baldwin et al. |
| 2009/0311514 A1 | | 12/2009 | Shon et al. |
| 2011/0049122 A1 | * | 3/2011 | Baek et al. .............. 219/385 |

FOREIGN PATENT DOCUMENTS

| | | |
|---|---|---|
| DE | 4124801 A1 | 1/1993 |
| DE | 4200237 A1 | 7/1993 |
| GB | 769069 | 5/1955 |
| JP | 2005-008974 A | 1/2005 |

* cited by examiner

*Primary Examiner* — Shawntina Fuqua
(74) *Attorney, Agent, or Firm* — Dentons US LLP

(57) ABSTRACT

Provided are a enamel composition, a preparation method thereof, and a cooking appliance. The enamel composition includes a glass frit comprising $P_2O_5$, $SiO_2$, $B_2O_3$, $Al_2O_3$, $R_2O$ (where R is an alkali metal), a chemical property enhancement component, and an adhesion enhancement component. The chemical property enhancement component includes at least one of $ZrO_2$ and $TiO_2$, and the adhesion enhancement component includes at least one of CoO, NiO, $MnO_2$ and $Fe_2O_3$.

10 Claims, 2 Drawing Sheets

ENAMEL COMPOSITION, PREPARATION METHOD THEREOF, AND COOKING APPLIANCE INCLUDING THE SAME

CROSS-REFERENCE TO RELATED APPLICATIONS

The present application claims priority under 35 U.S.C. §119 to Korean Patent Application No. 10-2012-0049545 filed on May 10, 2012, and Korean Patent Application No. 10-2013-0030200 filed on Mar. 21, 2013, which are hereby incorporated by reference in their entirety.

BACKGROUND

Enamels are prepared by applying hyaline glaze on a surface of a metal plate. General enamels may be used in cooking appliances such as microwaves, electronic ranges, and the like. Enamels may be classified as acid proof enamels for antioxide and heat-resisting enamels which are endured at a high temperature according to a kind or use of glaze. Also, enamels may be classified as aluminum enamels, zirconium enamels, titanium enamels, and soda glass enamels according to a material added into the enamels.

Generally, cooking appliances are home appliances for heating and cooking foods using a heat source. Slops generated during the cooking may be attached to an inner wall of a cavity of such a cooking appliance. Thus, after foods are cooked in the cooking appliance, it is necessary to clean the inside of the cavity. Also, the cooking of foods may involve a high temperature, and the inner wall of the cavity may be exposed to organic materials and alkali components. Thus, when enamels are used in cooking appliances, the enamels should have heat resistance, chemical resistance, wear resistance, and contamination resistance. Therefore, an enamel composition for improving the heat resistance, the chemical resistance, the wear resistance, and the contamination resistance may be required.

Particularly, a pyrolysis method in which contaminants burn at a high temperature to make ashes or a method using strong alkali detergent may be used as technologies for easily cleaning enamels used in general ovens. As a result, since the enamels are exposed to the high temperature and strong alkali detergent, enamels having chemical properties such as high heat resistance and chemical resistance are required.

Also, to prepare the above-described enamels, various kinds of glass frits may be used. That is, to prepare the enamels, glass frits having components different from each other may be used. In this case, various kinds of glass frits may be prepared, and then a process of mixing the glass frits with each other may be performed. Thus, high energy consumption and high faulty rate may occur.

SUMMARY

Embodiments provide an enamel composition having improved heat resistance, chemical resistance, and cleaning performance, a preparation method thereof, and a cooking appliance including the same.

In one embodiment, an enamel composition includes: a glass frit including $P_2O_5$, $SiO_2$, $B_2O_3$, $Al_2O_3$, $R_2O$ (where R is an alkali metal), a chemical property enhancement component, and an adhesion enhancement component, wherein the chemical property enhancement component includes at least one of $ZrO_2$ and $TiO_2$, and the adhesion enhancement component includes at least one of CoO, NiO, $MnO_2$ and $Fe_2O_3$.

The glass frit may further include at least one of F and a compound containing F.

$B_2O_3$ may be contained in an amount of about 13.6 wt % to about 19.6 wt % in the glass frit.

$R_2O$ may include at least one of $Na_2O$, $K_2O$, and $Li_2O$.

$R_2O$ may include $Na_2O$, $K_2O$, and $Li_2O$.

The glass frit may further include BaO, ZnO, CaO, and MgO.

The glass frit may contain about 11.0 wt % to about 17 wt % of $P_2O_5$, about 29.6 wt % to about 38.8 wt % of $SiO_2$, about 13.6 wt % to about 19.6 wt % of $B_2O_3$, about 3.8 wt % to about 13.2 wt % of $Al_2O_3$, about 1.8 wt % to about 6.9 wt % of F, about 0.4 wt % to about 1.6 wt % of $Li_2O$, about 5.3 wt % to about 14.5 wt % of $Na_2O$, about 2.3 wt % to about 4.5 wt % of $K_2O$, about 1.5 wt % to about 4.5 wt % of the chemical property enhancement compound, and about 2 wt % to about 7 wt % of the adhesion enhancement component.

The glass frit may contain about 11.0 wt % to about 17 wt % of $P_2O_5$, about 29.6 wt % to about 38.8 wt % of $SiO_2$, about 13.6 wt % to about 19.6 wt % of $B_2O_3$, about 0.4 wt % to about 1.6 wt % of $Li_2O$, about 5.3 wt % to about 14.5 wt % of $Na_2O$, about 2.3 wt % to about 4.5 wt % of $K_2O$, about 3.8 wt % to about 13.2 wt % of $Al_2O_3$, about 0.8 wt % to about 4.1 wt % of $ZrO_2$, about 0.1 wt % to about 1.5 wt % of $TiO_2$, about 1.8 wt % to about 6.9 wt % of F, about 0.6 wt % to about 2.6 wt % of CoO, about 0.1 wt % to about 0.6 wt % of $MnO_2$, about 0.3 wt % to about 1.4 wt % of NiO, and about 0.1 wt % to about 4.3 wt % of $Fe_2O_3$.

In another embodiment, a method of preparing an enamel composition includes: preparing a glass frit material including $P_2O_5$, $SiO_2$, $B_2O_3$, $Al_2O_3$, $R_2O$ (where R is an alkali metal), a chemical property enhancement component, and an adhesion enhancement component; melting the glass frit material; and quenching the melted $P_2O_5$, $SiO_2$, $B_2O_3$, $Al_2O_3$, $R_2O$ (where R is an alkali metal), a chemical property enhancement component, and an adhesion enhancement component to form the enamel composition, wherein the chemical property enhancement component includes at least one of $ZrO_2$ and $TiO_2$, and the adhesion enhancement component includes at least one of CoO, NiO, $MnO_2$ and $Fe_2O_3$.

In further another embodiment, a cooking appliance includes: a cavity defining a cooking chamber; a door selectively opening or closing the cooking chamber; at least one heating source providing heat to heat foods into the cooking chamber; and a coating layer formed of one of the above-mentioned enamel composition, which is coated on an inner surface of the cavity.

In further another embodiment, a cooking appliance includes: a cavity defining a cooking chamber; a door selectively opening or closing the cooking chamber; at least one heating source providing heat to heat foods into the cooking chamber; and a coating layer formed of one of the above-mentioned enamel composition, which is coated on a back surface of the door facing the cooking chamber in a state where the inside of the cooking chamber is covered by the door.

The details of one or more embodiments are set forth in the accompanying drawings and the description below. Other features will be apparent from the description and drawings, and from the claims.

DETAILED DESCRIPTION OF THE EMBODIMENTS

Figure 1:
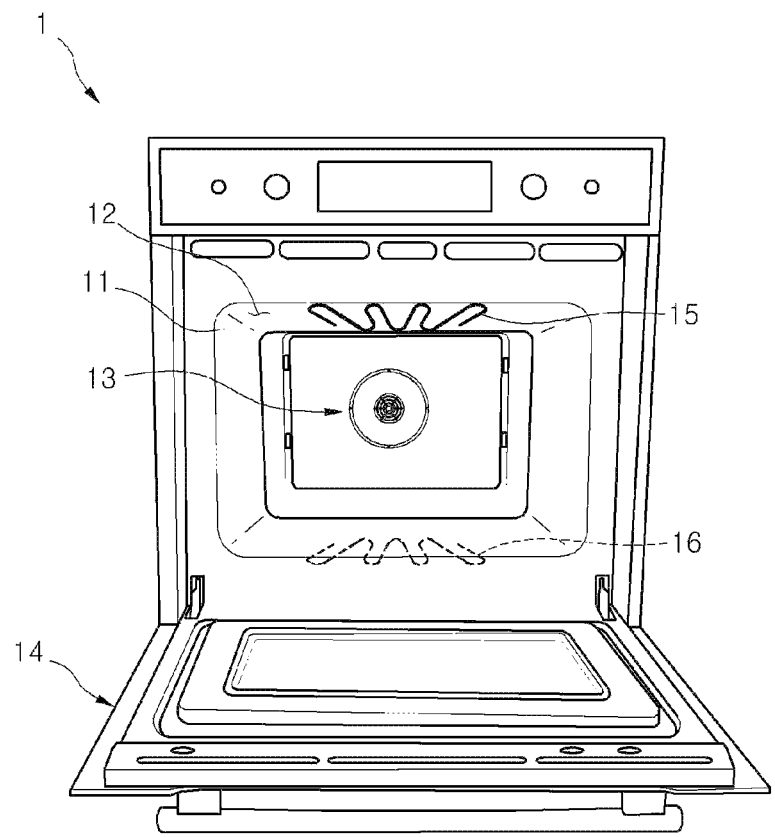
FIG. 1 is a front view of a cooking appliance according to an embodiment.

An enamel composition according to an embodiment includes a glass frit including $P_2O_5$, $SiO_2$, $B_2O_3$, $Al_2O_3$, $R_2O$ (where R is an alkali metal), a chemical property enhancement component, and an adhesion enhancement component.

Also, the glass frit may further include at least one of F and a compound including F.

Also, the chemical property enhancement component may include $ZrO_2$ and $TiO_2$.

Also, the adhesion enhancement component may include CoO, NiO, $MnO_2$, and $Fe_2O_3$.

$R_2O$ may include at least one of $Na_2O$, $K_2O$, and $Li_2O$.

$R_2O$ may include $Na_2O$, $K_2O$, and $Li_2O$

Also, the glass frit may further include BaO, ZnO, CaO, and MgO.

$SiO_2$ and $B_2O_3$ may be main components of the glass frit. $SiO_2$ and $B_2O_3$ may be contained in an amount of about 40 wt % to about 60 wt % in the glass frit.

Also, $SiO_2$ may be contained in an amount of about 29.6 wt % to about 42.2 wt % in the glass frit. Preferably, $SiO_2$ may be contained at a rate of about 29.6 wt % to about 38.8 wt % in the glass frit.

Also, $B_2O_3$ may be contained in an amount of about 8 wt % to about 19.6 wt % in the glass frit. Preferably, $B_2O_3$ may be contained in an amount of about 13.6 wt % to about 19.6 wt % in the glass frit.

In addition to $SiO_2$ and $B_2O_3$ as the main components of the glass frit, the glass frit may contain $P_2O_5$, $Al_2O_3$, $R_2O$ (where R is an alkali metal), the chemical property enhancement component, and the adhesion enhancement component. That is, $SiO_2$ and $B_2O_3$ may perform a function as a solvent. Thus, $SiO_2$ and $B_2O_3$ together with $P_2O_5$, $Al_2O_3$, $R_2O$ (where R is an alkali metal), the chemical property enhancement component, and the adhesion enhancement component may constitute one glass frit.

Also, $SiO_2$ may be contained in the glass frit to improve acid resistance of the glass frit. Also, $B_2O_3$ may expand a stained glass area of the glass frit. In addition, $B_2O_3$ may adequately adjust a thermal expansion coefficient of the enamel composition according to an embodiment.

$P_2O_5$, and $R_2O$ (where R is an alkali metal) may form an alkali phosphate glass structure. Here, R may include at least one of Na, K, and Li or combination thereof. Also, $P_2O_5$, $Al_2O_3$, $Na_2O$, $K_2O$, and $Li_2O$ may give improved clean performance to the enamel composition according to an embodiment. That is, since the glass frit contains $P_2O_5$, $Al_2O_3$, $Na_2O$, $K_2O$, and $Li_2O$, when a coating layer formed of the enamel composition according to an embodiment is contaminated by foods, the coating layer may be easily cleaned by water.

$P_2O_5$ may be contained in an amount of about 11.0 wt % to about 27.1 wt % in the glass frit. Preferably, $P_2O_5$ may be contained at a rate of about 11 wt % to about 17 wt % in the glass frit.

$Na_2O$ may be contained in an amount of about 5.3 wt % to about 14.5 wt % in the glass frit. Also, $K_2O$ may be contained in an amount of about 2.3 wt % to about 4.5 wt % in the glass frit.

$Al_2O_3$ may be contained in an amount of about 3.8 wt % to about 13.2 wt % in the glass frit.

$Li_2O$ may be contained in an amount of about 0.4 wt % to about 1.6 wt % in the glass frit. The chemical property enhancement component may include at least one of $ZrO_2$ and $TiO_2$. In one embodiment, the chemical property enhancement component may include $ZrO_2$ and $TiO_2$. Thus, $ZrO_2$ and $TiO_2$ may be combined with each other to improve the chemical properties, i.e., the heat resistance and the chemical resistance of the enamel composition according to an embodiment.

The glass frit may have a glass deformation temperature of about 520° C. or more. For example, the glass frit may have a glass deformation temperature of about 520° C. to about 700° C. Thus, the coating layer formed of the enamel composition according to an embodiment may have a glass deformation temperature of about 520° C. or more, and more particularly, a glass deformation temperature of about 520° C. to about 700° C. As a result, the enamel composition according to an embodiment may form the coating layer which is not deformed at a high temperature.

Also, $ZrO_2$ may improve chemical durability of the glass frit. Particularly, $ZrO_2$ may complement weak chemical resistance of the alkali phosphate glass structure formed of $P_2O_5$, and $R_2O$.

Also, $SiO_2$, $Al_2O_3$, and $ZrO_2$ may be combined with each other to improve a surface hardness of the coating layer.

The chemical property enhancement component may be contained in an amount of about 1.5 wt % to about 4.5 wt % in the glass frit.

In detail, $ZrO_2$ may be contained at a rate of about 0.8 wt % to about 8.1 wt % in the glass frit. Preferably, $ZrO_2$ may be contained at a rate of about 0.8 wt % to about 4.1 wt % in the glass frit.

$TiO_2$ may be contained in an amount of about 0.1 wt % to about 2.0 wt % in the glass frit. Preferably, $TiO_2$ may be contained at a rate of about 0.1 wt % to about 1.5 wt % in the glass frit.

Also, F and/or a compound containing F may adequately adjust surface tension of the coating layer. Also, F and/or a compound containing F may improve obliterating power of the enamel composition according to an embodiment. That is, obliterating power of the coating layer may be improved by F and/or a compound containing F.

The compound containing F may include $CaF_2$, $(H_2)SiF_6$, $Na_2SiF_6$, or $AlF_3$. However, the current embodiment is not limited thereto, and thus, may include various compounds containing F. F and/or a compound containing F may be contained in an amount of about 1.8 wt % to about 7.7 wt % in the glass frit. Preferably, F may be may be contained at a rate of about 1.8 wt % to about 6.9 wt % in the glass frit.

The adhesion enhancement component may include at least one of CoO, NiO, $MnO_2$, and $Fe_2O_3$. In one embodiment, the adhesion enhancement component may include CoO, NiO, $MnO_2$, and $Fe_2O_3$. That is, the glass frit may include all of CoO, NiO, $MnO_2$, and $Fe_2O_3$.

Also, the glass frit may further include BaO, ZnO, CaO and/or MgO.

As the glass frit further includes BaO, ZnO, CaO and/or MgO, the properties such as the durability, heat resistance, surface tension, and chemical resistance of the coating layer may be further enhanced.

The adhesion enhancement component may be contained in an amount of about 2 wt % to about 7 wt % in the glass frit.

In one embodiment, the glass frit may contain about 11.0 wt % to about 17 wt % of $P_2O_5$, about 29.6 wt % to about 38.8 wt % of $SiO_2$, about 13.6 wt % to about 19.6 wt % of $B_2O_3$, about 3.8 wt % to about 13.2 wt % of $Al_2O_3$, about 1.8 wt % to about 6.9 wt % of F and/or a compound containing F, about 0.4 wt % to about 1.6 wt % of $Li_2O$, about 5.3 wt % to about 14.5 wt % of $Na_2O$, about 2.3 wt % to about 4.5 wt % of $K_2O$, about 1.5 wt % to about 4.5 wt % of the chemical property enhancement component, and about 2 wt % to about 7 wt % of the adhesion enhancement component.

In another embodiment, the glass frit may contain about 11.0 wt % to about 17 wt % of $P_2O_5$, about 29.6 wt % to about 38.8 wt % of $SiO_2$, about 13.6 wt % to about 19.6 wt % of $B_2O_3$, about 0.4 wt % to about 1.6 wt % of $Li_2O$, about 5.3 wt % to about 14.5 wt % of $Na_2O$, about 2.3 wt % to about 4.5 wt % of $K_2O$, about 3.8 wt % to about 13.2 wt % of $Al_2O_3$, about 0.8 wt % to about 4.1 wt % of $ZrO_2$, about 0.1 wt % to about 1.5 wt % of $TiO_2$, about 1.8 wt % to about 6.9 wt % of F and/or a compound containing F, about 0.6 wt % to about 2.6 wt % of CoO, about 0.1 wt % to about 0.6 wt % of $MnO_2$, about 0.3 wt % to about 1.4 wt % of NiO, and about 0.1 wt % to about 4.3 wt % of $Fe_2O_3$.

The glass frit may have a diameter of about 0.1 µm to about 50 µm. Also, the glass frit may be dispersed into a solvent such as acetone or water. That is, the enamel composition according to an embodiment may be used by dispersing the glass frit into the solvent.

The enamel composition according to an embodiment may include $P_2O_5$, $SiO_2$, $B_2O_3$, $Al_2O_3$, $R_2O$ (where R is an alkali metal), the chemical property enhancement compound, and the adhesion enhancement component to form one glass frit. Also, the enamel composition may be directly coated on a base metal without performing ground coating.

In the related art, to apply a functional enamel composition on a base metal, a 2 coating 2 firing method in which a ground coating layer having adhesion is primarily formed on the base metal, and then, an enamel composition having functionality such as a cleaning property and an aesthetic property is coated on the ground coating layer. Thus, process costs may increase, and process efficiency may decrease due to the repeated processes. Alternatively, in a case where the functional enamel composition is directly coated without performing the ground coating, a plurality of glass frits different from each other, such as a glass frit having the adhesion and a glass frit having the cleaning property, but not one glass frit, may be mixed with each other. In this case, however, it may be difficult to adequately control the adhesion and cleaning properties through a mixed ratio of the glass frits different from each other.

On the other hand, the enamel composition according to an embodiment of the present invention may be directly coated on the base metal without performing the ground coating by adequately controlling a ratio of components serving as the grounding coating, e.g., $SiO_2$ and $B_2O_3$ and the functional components having the cleaning property. Thus, the enamel composition may be coated on the base metal through a 1 coating 1 firing method.

This 1 coating 1 firing process may reduce process costs and improve process efficiency.

Also, since the enamel composition is formed by using one glass frit without using a plurality of glass frits different from each other, the limitation due to the mixing of the glass frits may be resolved.

The enamel composition according to an embodiment may be prepared by following processes.

First, a glass frit material for forming the glass frit is prepared. The glass frit material includes $P_2O_5$, $SiO_2$, $B_2O_3$, $Al_2O_3$, $R_2O$ (where R is an alkali metal), a chemical property enhancement component, and an adhesion enhancement component. Also, the glass frit material may further include at least one of F and a compound containing F. Also, the chemical property enhancement component may include $ZrO_2$ and $TiO_2$. Also, the adhesion enhancement component may include CoO, NiO, $MnO_2$ and $Fe_2O_3$. Also, R (i.e., the alkali metal) may include at least one of Na, K, and Li. Also, R (i.e., the alkali metal) may include Na, K, and Li. Also, the glass frit material may further include BaO, ZnO, CaO, and/or MgO.

Thereafter, the glass frit material may be melted. For example, the glass frit material may be melted at a temperature of about 1,300° C. to about 1,600° C. Also, the glass frit material may be melted for a time of about 1 hour to about 1½ hours.

Thereafter, the melted glass frit material may be quenched by using a chiller. As a result, the glass frit may be formed. Here, a content of each of the components of the glass frit may be determined according to a content of each of the components included in the glass frit material. That is, a content of each of the components included in the glass frit material may be substantially equal to that of each of the components of the glass frit.

Thereafter, the glass frit may be dispersed by a solvent such as acetone. Thereafter, the solvent may be dried. Thereafter, the glass frit may be filtered by a mesh or the like. Particularly, the glass frit may be filtered so that the glass frit has a diameter of about 50 µm or less.

As described above, an enamel composition including the glass frit may be formed.

Thereafter, the enamel composition according to an embodiment may form the coating layer through dry and wet processes such as following processes.

First, the enamel composition according to an embodiment may be dispersed into a solvent such as water. That is, the glass frit may be dispersed into the solvent. Thereafter, the enamel composition according to an embodiment is coated on one surface of a target object to be coated through a spray method. The target object may be a metal plate or a tempered glass plate. Particularly, the target object may be a portion or the whole of a cooking appliance.

On the other hand, the enamel composition according to another embodiment may be coated on the target object in a state where the enamel composition is dried. The enamel composition according to an embodiment may be coated on the target object through electrostatic attraction.

Thereafter, the target object coated with the enamel composition according to an embodiment may be fired at a temperature of about 700° C. to about 900° C. The coated enamel composition may be fired for about 100 seconds to about 400 seconds.

Here, a content of each of components contained in the glass frit before the firing may be equal to that of each of components contained in the glass frit after the firing.

For example, each of the content of each of the components contained in the glass frit before the firing and the content of each of the components contained in the glass frit after the firing may contain about 11.0 wt % to about 17 wt % of $P_2O_5$, about 29.6 wt % to about 38.8 wt % of $SiO_2$, about 13.6 wt % to about 19.6 wt % of $B_2O_3$, about 0.4 wt % to about 1.6 wt % of $Li_2O$, about 5.3 wt % to about 14.5 wt % of $Na_2O$, about 2.3 wt % to about 4.5 wt % of $K_2O$, about 3.8 wt % to about 13.2 wt % of $Al_2O_3$, about 0.8 wt % to about 4.1 wt % of $ZrO_2$, about 0.1 wt % to about 1.5 wt % of $TiO_2$, about 1.8 wt % to about 6.9 wt % of F and/or the compound containing F, about 0.6 wt % to about 2.6 wt % of CoO, about 0.1 wt % to about 0.6 wt % of $MnO_2$, about 0.3 wt % to about 1.4 wt % of NiO, and about 0.1 wt % to about 4.3 wt % of $Fe_2O_3$.

As a result, the enamel composition according to an embodiment may form a coating layer on the target object, e.g., a portion or the whole of the cooking appliance.

The coating layer may have the high chemical properties, for example, the high heat resistance and the high chemical resistance by combining the components such as $ZrO_2$ and $TiO_2$. Also, the coating layer may provide the enamel having a high surface hardness through the components such as $Al_2O_3$, $SiO_2$, and $ZrO_2$. Also, the coating layer may provide the improved cleaning property through the components such as $P_2O_5$, $Al_2O_3$, and $R_2O$.

Thus, the enamel composition according to an embodiment may provide the coating layer having improved heat resistance, cleaning performance, and chemical resistance.

Also, the enamel composition according to an embodiment may include all of $P_2O_5$, $SiO_2$, $B_2O_3$, $Al_2O_3$, $R_2O$, the chemical property enhancement component, and the adhesion enhancement component in one kind of glass frit.

Thus, as described above, the enamel composition according to an embodiment may easily form the coating layer on cooking appliances such as ovens by using one kind of glass frit. That is, the enamel composition according to an embodiment includes the components required for the coating layer of the cooking appliance in one kind of glass frit.

Thus, the enamel composition according to an embodiment may provide the coating layer having a uniform property on the whole. Also, the enamel composition according to an embodiment may be easily prepared through a simple process.

Hereinafter, a cooking appliance according to an embodiment will be described in detail with reference to the accompanying drawings.

Figure 2:
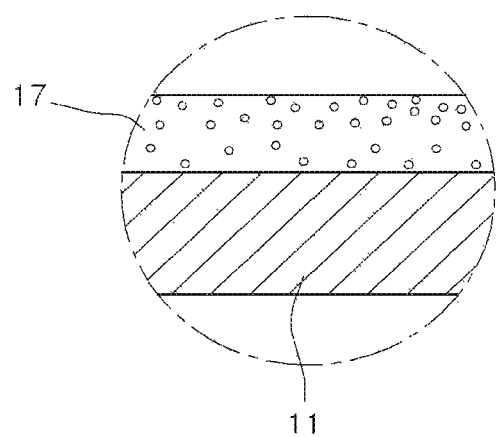
FIG. 2 is a partial enlarged cross-sectional view illustrating an inner surface of a cavity of FIG. 1.
Figure 3:
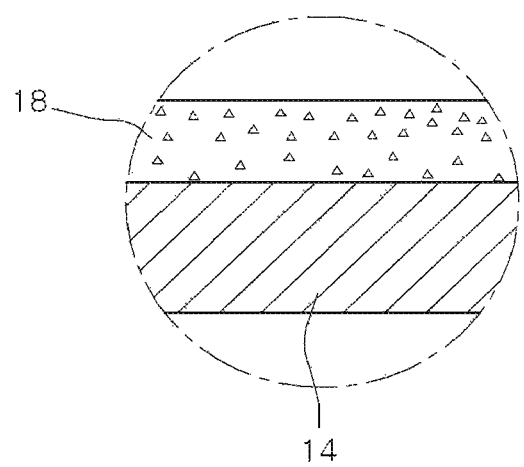
FIG. 3 is a partial enlarged cross-sectional view illustrating a back surface of a door of FIG. 1.

FIG. 1 is a front view of a cooking appliance according to an embodiment. FIG. 2 is a partial exploded cross-sectional view illustrating an inner surface of a cavity of FIG. 1. FIG. 3 is a partial enlarged cross-sectional view illustrating a back surface of a door of FIG. 1.

Referring to FIG. 1, a cooking appliance 1 includes a cavity 11 defining a cooking chamber 12, a door 14 for selectively opening or closing the cooking chamber 12, and at least one heating source 13, 15, or 16 providing heat for heating foods into the cooking chamber 12.

In more detail, the cavity 11 may have an approximately hexahedral shape with an opened front side. The heating sources 13, 15, and 16 include a convection assembly 13 for discharging heated air into the cavity 11, an upper heater 15 disposed on an upper portion of the cavity 11, and a lower heater disposed on a lower portion of the cavity 11. The upper heater 15 and the lower heater 16 may be disposed inside or outside the cavity 11. The heating source 13, 15, or 16 does not necessarily need to include the convection assembly 13, the upper heater 15, and the lower heater 16. That is, the heating source 13, 15, or 16 may include at least one of the convection assembly 13, the upper heater 15, and the lower heater 16.

Referring to FIG. 2, coating layer 17 is disposed on an inner surface of the cavity 11. The coating layer 17 is prepared by coating the above-described enamel composition on the inner surface of the cavity 11. Substantially, the coating layer may improve heat resistance, chemical resistance, and contamination resistance on the inner surface of the cavity 11.

Particularly, the cavity 11 and the door 14 may be provided as metal plates, respectively. The coating layers 17 and 18 may be directly coated on the metal plates. That is, since the enamel composition according to an embodiment contain the adhesion enhancement component, the coating layers 17 and 18 may be directly coated on the metal plates without providing an additional buffer layer.

Referring to FIG. 3, the coating layer 18 is disposed on the back surface of the door 14. Particularly, the coating layer 18 may be disposed on the back surface of the door 14 facing the cooking chamber 12 in a state where the cooking chamber 12 is covered by the door 14. The coating layer 18 may improve the heat resistance, the chemical resistance, and the contamination resistance on the back surface of the door 14. That is, the back surface of the door 14 may have the same effect as the inner surface of the cavity 11.

Thus, the inner surface of the cavity 11 and the back surface of the door 14 may be improved in heat resistance and thus endured for a long time during the cooking and cleaning of the foods at a high temperature. Also, since the inner surface of the cavity 11 and the back surface of the door 14 are improved in contamination resistance by the coating layers 17 and 18, a phenomenon in which the inner surface of the cavity 11 and the back surface of the door 14 are contaminated by organic materials may be reduced, and also, the inner surface of the cavity 11 and the back surface of the door 14 may be easily cleaned. Also, since the inner surface of the cavity 11 and the back surface of the door 14 are improved in chemical resistance, the inner surface of the cavity 11 and the back surface of the door 14 are not corroded without being deformed by organic materials and alkali chemical components even though the cooking appliance is used for a long time.

The enamel composition according to the embodiment may have the high heat resistance and chemical resistance by combining components such as $ZrO_2$ and $TiO_2$. Also, the enamel composition according to the embodiment may provide the enamel having the high surface hardness through the components such as $Al_2O_3$, $SiO_2$, and $ZrO_2$.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. Therefore, contents with respect to various variations and modifications will be construed as being included in the scope of the present disclosure.

Example 1

Dry Process

As shown in Table 1 below, glass frit materials (Compositions 1-4) are provided. Each of the glass frit material is melted for 1 hour at a temperature of about 1,500° C. Thereafter, the melted glass frit material is quenched through a chiller to manufacture a raw frit. Then, the raw frit is milled for 5 hours by using a ball mill after 0.1 wt % of polysiloxane is added. The milled frit is filtered by using a mesh (325 mesh sieve, ASTM C285-88) so that the milled frit has a diameter of about 45 μm, thereby forming enamel composition (enamel powder).

Thereafter, the enamel composition including the glass frit is coated on an iron plate through a corona discharge gun.

Thereafter, the coated enamel composition is fired at a temperature of about 850° C. for about 300 seconds to form a coating layer.

Example 2

Wet Process

As shown in Table 1 below, glass frit materials is provided (Compositions 1-4). Each of the glass frit material is melted for 1 hour at a temperature of about 1,500° C. Thereafter, the melted glass frit material is quenched through a chiller to manufacture a raw frit.

About 50 wt % of the raw frit and about 50 wt % of water are mixed with each other, and then about 10 wt % of ball clay, about 0.25 wt % of nitrous acid, about 0.1 wt % of borax, about 2 wt % of aluminum oxide, and about 0.3 wt % of sodium nitrate are added thereto. Then, the mixture is mixed for about 10 hours to about 20 hours by using a wet ball mill or a mixer similar to the ball mill to manufacture slip.

The manufactured slip is controlled in particle size so that about 55 cc of the manufactured slip passes through a 400 mesh, and then about 1 g to about 3 g of the slip that does not pass through the 400 mesh exist.

Then, the manufactured slip for wet enamel is sprayed or dipped by using an air spray gun that is generally used for a low carbon steel sheet having a thickness of about 1 mm and a square of about 200 mm×200 mm.

An amount of glass frit sprayed on the steel sheet is about 370 g/m². A separate dry process (for about 5 minutes to 10 minutes at a temperature of about 200° C. to about 250° C.) is performed on the slip after the slip is coated on the steel sheet. As described above, the low carbon steel sheet on which the glass frit for the enamel is sprayed and then dried is fired for about 150 seconds to about 350 seconds at a temperature of about 820° C. to about 850° C. to form a coating layer.

Comparative Example 1

As shown in Table 2 below, a glass frit material for a conventional borosilicate-based enamel composition is prepared (Composition 5). Then, an enamel composition is manufactured through the method of Example 1 and Example 2. Thereafter, the manufactured enamel composition is fired to form a coating layer.

TABLE 1

| | Rate (wt %) | | | |
|---|---|---|---|---|
| Component | Composition 1 | Composition 2 | Composition 3 | Composition 4 |
| $P_2O_5$ | 15.36 | 11.05 | 14.42 | 15.61 |
| $SiO_2$ | 35.01 | 33.51 | 38.78 | 29.65 |
| $B_2O_3$ | 15.50 | 17.08 | 13.68 | 17.13 |
| $Na_2O$ | 8.56 | 8.08 | 5.37 | 13.03 |
| $K_2O$ | 3.42 | 4.37 | 4.44 | 2.47 |
| $Li_2O$ | 1.20 | 1.35 | 1.31 | 0.51 |
| $Al_2O_3$ | 11.02 | 13.19 | 10.89 | 9.66 |
| $ZrO_2$ | 3.60 | 2.13 | 2.08 | 2.77 |
| $TiO_2$ | 0.55 | 1.42 | 1.39 | 0.44 |
| F | 2.40 | 5.68 | 5.56 | 1.91 |
| $CoO + MnO + NiO + Fe_2O_3$ | 3.39 | 2.13 | 2.08 | 6.82 |

TABLE 2

| Component | Composition 5 Rate (wt %) |
|---|---|
| $SiO_2$ | 60 |
| $B_2O_3$ | 14 |
| $Na_2O$ | 14 |
| CaO | 1.5 |
| CuO | 1.5 |
| $Li_2O$ | 1 |
| $TiO_2$ | 2 |
| $ZrO_2$ | 2 |
| $Al_2O_3$ | 1 |
| MgO | 1 |
| ZnO | 1 |

TABLE 2-continued

| Component | Composition 5 Rate (wt %) |
|---|---|
| NiO | 1.2 |
| $Co_2O_3$ | 0.8 |

Comparative Examples 2 and 3

As shown in Table 3 below, glass frit materials are prepared (Compositions 6-7). Then, an enamel composition is manufactured through the method of Example 1 and Example 2. Thereafter, each of the manufactured enamel composition is fired to form a coating layer.

TABLE 3

| | Rate (wt %) | |
|---|---|---|
| Component | Composition 6 | Composition 7 |
| $P_2O_5$ | 12.3 | 15.4 |
| $SiO_2$ | 28.8 | 34.2 |
| $B_2O_3$ | 19.6 | 13 |
| $Na_2O$ | 8.6 | 7.8 |
| $K_2O$ | 3.8 | 4.5 |
| $Li_2O$ | 0.7 | 1.2 |
| $Al_2O_3$ | 16.3 | 13.3 |
| $ZrO_2$ | 0.7 | 3.2 |
| $TiO_2$ | 1.1 | 0.5 |
| F | 6 | 3.4 |
| $CoO + MnO + NiO + Fe_2O_3$ | 2.1 | 3.5 |

Results

It is seen that each of the coating layer formed as described above in Examples 1 and 2 has a glass deformation temperature Td of about 530° C., i.e., very high heat resistance characteristics. However, the glass deformation temperature Td of Comparative Example 2 is 470° C. Particularly, to measure a thermal expansion coefficient and a heat resistance characteristic of a glass, both surfaces of a sample is ground in parallel, and then, a glass deformation temperature and a transition temperature and a thermal expansion coefficient up to Ts (glass softening point) by using a thermo mechanical analyzer (TMA).

The cleaning performance of the enamel compositions according to Example 1 and Example 2 is measured. In a method of measuring the cleaning performance, about 1 g of chicken oil or monster mesh is smoothly covered on a surface of a test body (a sample coated with an enamel having a size of about 200 mm×200 mm) by using a brush, and then, the test body coated with the contaminant is put into a constant-temperature oven to solidify the contaminant at 240° C. for 1 hour. After the contaminant is solidified, the test body is naturally cooled to confirm a cured degree thereof. Then, the test body is immersed into a 25° C. water bath, for 10 minutes. Thereafter, the cured chicken oil is polished with a force of less than 2.5 kgf by using a wet cloth. The surface of the contaminated enamel is uniformly polished by using a rod having a flat bottom with a diameter of about 5 cm. Here, reciprocating numbers for polishing are measured and then defined as cleaning numbers. Here, an evaluation index is as follows. The cleaning performance of the coating layer formed of the enamel compositions according to Example 1 and Example 2, which are measured through the above-described method, is Level 5. Table 4 below shows the criteria for the cleaning performance. On the other hand, the cleaning performance of the enamel composition according to Comparative Example 1 is Level 1.

That is, the cleaning performance of the enamel compositions according to Examples 1 and 2 may be significantly superior to that of the boro silicate-based enamel composition of Comparative Example 1 that is used for general cooking appliances and oven ranges. Thus, it may be seen that the cooking appliances and the oven ranges are easily cleaned by using the enamel compositions.

Also, acid and alkali resistance performance of the coating layer formed of the enamel composition is measured. The acid resistance evaluation is performed by observing a surface change of the coating layer after a few drops of about 10% of a citric acid solution drops onto the sample of the fired enamel to cleanly polish the solution after about 15 minutes. The alkali resistance evaluation is performed by using about 10% of an anhydrous sodium carbonate solution as a reagent through the same method as the acid resistance evaluation.

As a result, the acid resistance performance of the coating layers formed of the enamel compositions according to Examples 1 and 2 is Grade AA, and the alkali resistance performance is Grade AA. However, the acid resistance performance of the coating layer formed of the enamel composition according to Comparative Example 2 is Grade C. Here, a degree of the acid and alkali resistance performance is evaluated by an ASTM or ISO 2722 method. Here, Grade AA represents very good, Grade A represents good, Grade B represents normal, Grade C represents low, and Grade D represents very low.

TABLE 4

| Cleaning number (Number) | Level |
|---|---|
| 1~5 | 5 |
| 6~15 | 4 |
| 16~25 | 3 |
| 26~50 | 2 |
| 51~ | 1 |

As described above, it is seen that the coating layer including an enamel composition according to embodiments of the present invention has high cleaning performance, high heat resistance, thermal shock stability, high chemical resistance, and high adhesion.

What is claimed is:

1. An enamel composition comprising:
  a glass frit comprising $P_2O_5$, $SiO_2$, $B_2O_3$, $Al_2O_3$, $R_2O$ (where R is an alkali metal), a chemical property enhancement component, an adhesion enhancement component, F and a compound containing F,
  wherein the chemical property enhancement component comprises one of $ZrO_2$ and $TiO_2$, and
  wherein the adhesion enhancement component comprises one of CoO, NiO, $MnO_2$, and $Fe_2O_3$,
  wherein $R_2O$ comprises $Na_2O$, $K_2O$ and $Li_2O$,
  wherein the glass frit contains:
    11.0 wt % to 17 wt % of $P_2O_5$,
    29.6 wt % to 38.8 wt % of $SiO_2$,
    13.6 wt % to 19.6 wt % of $B_2O_3$,
    3.8 wt % to 13.2 wt % of $Al_2O_3$,
    1.8 wt % to 6.9 wt % of F and/or the compound containing F,
    0.4 wt % to 1.6 wt % of $Li_2O$,
    5.3 wt % to 14.5 wt % of $Na_2O$,
    2.3 wt % to 4.5 wt % of $K_2O$,
    1.5 wt % to 4.5 wt % of the chemical property enhancement component, and
    2 wt % to 7 wt % of the adhesion enhancement component.

2. The enamel composition according to claim 1, wherein the chemical property enhancement component comprises $ZrO_2$ and $TiO_2$.

3. The enamel composition according to claim 2, wherein the adhesion enhancement component comprises CoO, NiO, MnO, and $Fe_2O_3$.

4. The enamel composition according to claim 1, wherein the glass frit further comprises BaO, ZnO, CaO, and MgO.

5. The enamel composition according to claim 1, wherein the glass frit further contains:
  0.8 wt % to 4.1 wt % of $ZrO_2$,
  0.1 wt % to 1.5 wt % of $TiO_2$,
  1.8 wt % to 6.9 wt % of F and/or the compound containing F,
  0.6 wt % to 2.6 wt % of CoO,
  0.1 wt % to 0.6 wt % of $MnO_2$,
  0.3 wt % to 1.4 wt % of NiO, and
  0.1 wt % to 4.3 wt % of $Fe_2O_3$.

6. A method of preparing an enamel composition, the method comprising:
  preparing a glass frit material comprising $P_2O_5$, $SiO_2$, $B_2O_3$, $Al_2O_3$, $R_2O$ (where R is an alkali metal), a chemical property enhancement component, and an adhesion enhancement component, and one of F and a compound containing F;
  melting the glass frit material;
  quenching the melted $P_2O_5$, $SiO_2$, $B_2O_3$, $Al_2O_3$, $R_2O$, a chemical property enhancement component, and an adhesion enhancement component to form the enamel composition,
  wherein the chemical property enhancement component comprises $ZrO_2$ and $TiO_2$, and
  wherein the adhesion enhancement component comprises CoO, NiO, $MnO_2$, and $Fe_2O_3$,
  wherein the glass frit contains:
    11.0 wt % to 17 wt % of $P_2O_5$,
    29.6 wt % to 38.8 wt % of $SiO_2$,
    13.6 wt % to 19.6 wt % of $B_2O_3$,
    0.4 wt % to 1.6 wt % of $Li_2O$,
    5.3 wt % to 14.5 wt % of $Na_2O$,
    2.3 wt % to 4.5 wt % of $K_2O$,
    3.8 wt % to 13.2 wt % of $Al_2O_3$,
    0.8 wt % to 4.1 wt % of $ZrO_2$,
    0.1 wt % to 1.5 wt % of $TiO_2$,
    1.8 wt % to 6.9 wt % of F and/or the compound containing F,
    0.6 wt % to 2.6 wt % of CoO,
    0.1 wt % to 0.6 wt % of $MnO_2$,
    0.3 wt % to 1.4 wt % of NiO, and
    0.1 wt % to 4.3 wt % of $Fe_2O_3$.

7. A method of coating an enamel composition, the method comprising:
  preparing a substrate;
  coating the enamel composition on the substrate; and
  firing the enamel composition,
  wherein the enamel composition comprises a glass frit containing
    11.0 wt % to 17 wt % of $P_2O_5$,
    29.6 wt % to 38.8 wt % of $SiO_2$,
    13.6 wt % to 19.6 wt % of $B_2O_3$,
    0.4 wt % to 1.6 wt % of $Li_2O$,
    5.3 wt % to 14.5 wt % of $Na_2O$,
    2.3 wt % to 4.5 wt % of $K_2O$, 3.8 wt % to 13.2 wt % of $Al_2O_3$,
0.8 wt % to 4.1 wt % of $ZrO_2$,
0.1 wt % to 1.5 wt % of $TiO_2$,
1.8 wt % to 6.9 wt % of F and/or the compound containing F,
0.6 wt % to 2.6 wt % of CoO,
0.1 wt % to 0.6 wt % of $MnO_2$,
0.3 wt % to 1.4 wt % of NiO, and
0.1 wt % to 4.3 wt % of $Fe_2O_3$.

8. The method according to claim 7, wherein, after the firing of the enamel composition is performed, the glass frit contains:
11.0 wt % to 17 wt % of $P_2O_5$,
29.6 wt % to 38.8 wt % of $SiO_2$,
13.6 wt % to 19.6 wt % of $B_2O_3$,
0.4 wt % to 1.6 wt % of $Li_2O$,
5.3 wt % to 14.5 wt % of $Na_2O$,
2.3 wt % to 4.5 wt % of $K_2O$,
3.8 wt % to 13.2 wt % of $Al_2O_3$,
0.8 wt % to 4.1 wt % of $ZrO_2$,
0.1 wt % to 1.5 wt % of $TiO_2$,
1.8 wt % to 6.9 wt % of F and/or the compound containing F,
0.6 wt % to 2.6 wt % of CoO,
0.1 wt % to 0.6 wt % of $MnO_2$,
0.3 wt % to 1.4 wt % of NiO, and
0.1 wt % to 4.3 wt % of $Fe_2O_3$.

9. A cooking appliance, comprising:
a cavity defining a cooking chamber;
a door selectively opening or closing the cooking chamber;
a heating source to heat foods within the cooking chamber; and
a coating layer comprising the enamel composition according to claim 1,
wherein the coating layer is coated on an inner surface of the cavity.

10. A cooking appliance, comprising:
a cavity defining a cooking chamber;
a door selectively opening or closing the cooking chamber;
a heating source to heat foods within the cooking chamber; and
a coating layer comprising the enamel composition according to claim 1,
wherein the coating layer is coated on a back surface of the door facing the cooking chamber in a state where an inside of the cooking chamber is covered by the door.

* * * * *